3,798,239
NAPHTHYLOXYALKOXYANTHRAQUINONE
DYES
Guido Roger Genta, 38 Church St.,
Lock Haven, Pa. 17745
No Drawing. Filed Sept. 25, 1970, Ser. No. 75,705
Int. Cl. C09b 1/54
U.S. Cl. 260—380                                    3 Claims

ABSTRACT OF THE DISCLOSURE

New anthraquinone dyes, 1-amino-2-naphthyloxyalkoxy-4-hydroxy anthraquinones, are provided. Synthetic textile fibers, in particular, polyethylene terephthalate fibers, when dyed with the new dyes, are colored in bright pink shades which are substantive, light fast, and sublimation resistant.

BACKGROUND OF THE INVENTION

Aromatic polyester fibers, such as polyethylene terephthalate fibers, do not readily accept the higher molecular weight dyes, which generally provide dyeings of superior physical properties. As a result, it is difficult to find dyes of acceptable shade and brightness which, when dyed by conventional methods on for example, polyethylene terephthalate, are acceptable in all of the important physical properties of substantivity, light fastness and resistance to sublimation. The standard of performance required with respect to these physical properties has become increasingly critical because of the demands of the textile industry. Recent standards are such that dyes which were considered acceptable or marginally acceptable several years ago are now regarded as unsuitable and have been replaced in the market by dyes of better overall performance.

I have discovered new anthraquinone dyes which give outstanding overall performance when dyed on aromatic polyester fibers, particularly on polyethylene terephthalate. The affinity for the fiber, light fastness and resistance to sublimation of my new compounds is, by current standards, quite remarkable when considered in the light of the performance of certain structurally similar materials. For example, Lodge, in U.S. 2,992,240, describes the use on polyester fibers of a series of 1-amino-4-hydroxy-2-substituted anthraquinones in which the 2-substituent is a lower alkoxy lower alkoxy or a monocyclic aryloxy lower alkoxy radical. Typical dyes of this series, such as 1-amino-2-phenoxyethoxy-4-hydroxy anthraquinone, have acceptable shade and good affinity for polyester fibers. However, such dyes have only fair sublimation characteristics, particularly at higher temperatures. Formerly, for fibers colored by either disperse dyeing or by the Thermosol process, sublimation was evaluated at temperatures of 350° and 400°. A color which had good sublimation at temperatures up to 400° F. was considered commercially desirable. Recently, colors are critically evaluated in the higher temperature ranges of 400° to 425° F. and the desired performance is good to excellent at such temperatures. My new dyes satisfy these modern commercial standards.

SUMMARY

In accordance with the invention, I have discovered new anthraquinone dyes of the formula:

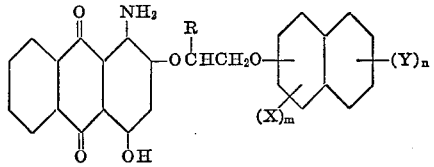

In the above formula, X and Y are independently chosen from the group consisting of hydrogen, chloro, bromo, lower alkyl, lower alkoxy and hydroxy, m and n are integers having the value of 1 or 2 and R is hydrogen or methyl. The new dyes, when applied to a synthetic polyester textile fiber in an amount such that the colored fiber contains about 0.1–2% by weight dye, provide colored fibers of bright pink shades having outstanding light and sublimate characteristics as well as good substantivity.

DETAILED DESCRIPTION

The new dyes are made from 1-amino-4-hydroxyanthraquinone compounds containing a halo, sulfo or phenoxy group in the 2-position.

The anthraquinone compound is reacted with an alkali metal salt of a derivative of ethyl or propyl alcohol. The ethyl alcohol intermediate is conveniently made by the addition of one mole of ethylene oxide or ethylenechlorohydrin to a naphthol which is either unsubstituted or appropriately substituted with chloro, bromo, lower alkyl, lower alkoxy or hydroxy groups. The propyl alcohol intermediates are made by the addition of a mole of propylene oxide to the appropriate naphthol. Alternatively, the propyl alcohol intermediate can be prepared by the reaction of the appropriate hydroxy compound and epichlorohydrin, followed by hydrolysis. Another preparative method is to react chloroacetone and a hydroxy compound, followed by reduction of the carboxyl group to hydroxyl. Typical ethyl and propyl alcohol intermediates are those of the formula:

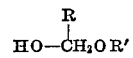

in which R is hydrogen or methyl and R' is 2-naphthyl, 1-naphthyl, 4-chloro-1-naphthyl, 2,4-dichloro-1-naphthyl, 2,4-dibromo-1-naphthyl, 5-chloro-2-naphthyl, 5-bromo-2-naphathyl, 4-methyl-1-naphthyl, 4-ethyl-1-naphthyl, 4-t-butyl-2-naphthyl, 6-methyl-1-naphthyl, 4,6-dimethyl-1-naphthyl, 5-hydroxy-1-naphthyl, 6-hydroxy-1-naphthyl, 7-hydroxy-1-naphthyl, 7-hydroxy-2-naphthyl, 5-hydroxy-2-naphthyl, 5-ethoxy-2-bromo-1-naphthyl, and 8-hydroxy-2-naphthyl.

Conveniently, the reaction is accomplished by mixing the anthraquinone compound with a substantial excess of the alcohol intermediate, which is converted to its alkali metal salt before reaction takes place. This is done by heating the alcohol in the presence of sodium or potassium hydroxide or carbonate in an amount sufficient to convert the hydroxy lower alkyl group to the sodium or potassium salt thereof. The mixture of anthraquinone compound and alcohol is heated to a temperature of at least 125° C., preferably 140° to 160° C., and held at that temperature until reaction is complete, which generally requires about 6 to 20 hours.

After the reaction is complete, an alcoholic solution of a mineral acid or organic acid, such as glacial acetic acid, previously diluted, is added drop-wise to the mass. The product dye is recovered by filtration and is washed first with denatured ethanol and subsequently with hot water until it is free of acid, inorganic materials, and excess solvent.

The dye may be standardized either as a disperse paste or a disperse powder by any of the basic standardizing techniques that have been known to the art for many years; i.e., by the use of appropriate amounts of common dispersants and standardizing agents, usually together with small amounts of anionic wetting agent to assist in dispersion.

Standardized pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The dispersed paste may be cut or standardized to a standard strength with water. As noted above, any conventional wetting agent, e.g., sodium cetyl sulfonate may be added to wet out the product. The final color content of the finished paste averages from 10–40 percent by weight (pure color) active dye base.

Standardized dispersed powders are prepared by wet milling color in the presence of a dispersant, such as those mentioned hereabove, in equipment, such as a ball mill, Werner-Pfleiderer mill or attritor. This dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxypolyethanol may be added to wet out the product. Dispersed powders are usually cut or standardized to 25–60 percent by weight color content (pure color).

The dye, when added to water with or without auxiliary agents, forms a near colloidal aqueous dispersion from which the aromatic polyester filer or textile material is dyed in the conventional manner at 40–100° C. 104–212° F.) to give a colored fiber containing about 0.01–2 percent by weight dye (100% color basis).

Alternatively, dyeing may be accomplished without a carrier at temperatures of 100–150° C. under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating the dried goods with hot air or heated contact rolls, is conveniently used for dyeing polyester fibers and blends containing these fibers. Temperatures of 180–220° C. (ea. 360–425° F.) are used for 30 to 90 seconds. If the fabric contains cotton or viscose rayon, apart from synthetic fibers, there is no danger of damaging cellulosic portions, but if wool is present, the temperature must be kept within 180–200° C. and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

My invention is further illustrated by the following examples:

Example 1

To a one liter flask were charged 150 g. 2-(2-naphthyloxy)ethanol, 60 g. tetrahydrothiophene-1,1-dioxide, and 20 g. potassium carbonate, ground. The mixture was heated to 80–85° C. and 50 g. 1-amino-2-phenoxy-4-hydroxyanthraquinone were added. The mixture was then heated to 145–150° C. and was held at this temperature during eight hours. After cooling to 90° C., the mass was diluted with 320 g. denatured ethanol containing 15 g. glacial acetic acid. The diluted product was stirred an additional 4 hours at 40–45° C., after which it was filtered, and washed with 150 g. denatured ethanol and finally with hot water.

There was thus obtained 94 g. of 52% cake (49 g. 100% pure dye) of a dye of the formula:

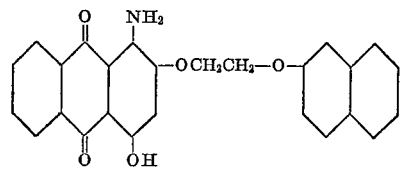

A paste was prepared by milling the cake thus obtained with 15% by weight (based on the weight of finished paste) of a ligninsulfonic acid derivative known commercially as "Marasperse N–22." The yield was 350 g. 14% paste.

Example 2

An aqueous dye bath containing 10% Marcron L (a commercially available phenolic dye carrier) and 1% monosodium phosphate as a buffering agent was prepared. Type 54 Dacron polyester fabric was treated in the bath at 120° F. for 10 minutes, the fabric to water dye bath ratio being 1:40. The disperse dye of Example 1 was added in an amount sufficient to provide a bath containing a 2% dye based on the weight of the polyester fiber. Dyeing was continued for one hour at 205° F. and the fabric was removed from the bath, rinsed and dried.

Sample dyeings were tested for subliminations according to standard AATCC Color Fastness of Dry Heat (sublimation) Test No. 117–1967T, page B–74 of the 1967 Technical Manual of the American Association of Textile Chemists and Colorists. The dyed fabric was placed between a sandwich of undyed Dacron polyester fabric swatches in an Atlas Scorch tester and heat was applied for 30 seconds. Sublimation tests were made at 350° F., 375° F., 400° F. and 425° F. on goods dyed as described above. The new dye was characterized by nearly perfect sublimation at temperatures of 375° F. and below and very good to excellent sublimation at the temperatures of 400° and 425° F.

Similar excellent results were obtained when the dye was applied to the fabric by the Thermosol process and then tested for sublimation.

The dyeing were also tested for light fastness by subjecting them to carbon arc fading in accordance with AATCC Color Fastness to Light: Carbon Arc Lamp, Continuous Light Test No. 16A–1964. The dyeings showed only a very slight break at 100 hours' exposure indicating superior fastness to light.

Example 3

The procedure of Example 1 was repeated with the exception that 150 g. of 2-(1-naphthyloxy)ethanol was used instead of the 2-naphthyl derivative. The resulting product had the formula:

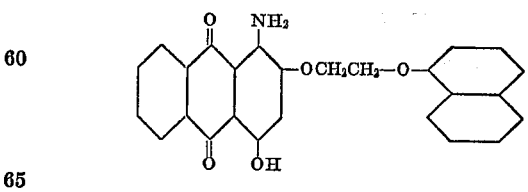

and was dispersed as described in Example 1. When tested for sublimation and light as described in Example 2, the sublimation characteristics were excellent and the light fastness substantially perfect up to 100 hours' exposure.

Example 4

For comparative purposes, the procedure of Example 1 was followed with the exception that β-phenoxyethanol, 150 g., was used in place of the 2-naphthyl derivative.

The resulting pcoduct, corresponding to that of Example 2 of Lodge, U.S. 2,992,240, dyed Dacron in a bright red shade having good substantially and excellent light fastness. However, the sublimation characteristics at 400°–425° F. were only good to fair; thus significantly inferior when contrasted with the results obtained using the dyes of the present invention.

Examples 5–27

By repeating the procedure of Example 1, replacing the 2-(2-naphthyloxy)ethanol with an equivalent amount of each of the intermediates shown in Table 1, the resulting dyes give bright pink shades with excellent sublimation and light fastness properties.

| Ex. No. | Intermediate | Color of dyed polyester |
|---|---|---|
| 5 | 2-[1-(4-chloronaphthyloxy)]ethanol | Bright pink. |
| 6 | 2-[1-(2,4-dichloronaphthyloxy)]ethanol | Do. |
| 7 | 2-[1-(2,4-dibromonaphthyloxy)]ethanol | Do. |
| 8 | 2-[2-(5-chloronaphthyloxy)]ethanol | Do. |
| 9 | 2-[2-(5-bromonaphthyloxy)]ethanol | Do. |
| 10 | 2-[1-(4-methylnaphthyloxy)]ethanol | Do. |
| 11 | 2-[1-(4-ethylnaphthyloxy)]ethanol | Do. |
| 12 | 2-[1-(4-5-butylnaphthyloxy)]ethanol | Do. |
| 13 | 2-[2-(4-methylnaphthyloxy)]ethanol | Do. |
| 14 | 2-[2-(4-t-butylnaphthyloxy)]ethanol | Do. |
| 15 | 2-[1-(6-methylnaphthyloxy)]ethanol | Do. |
| 16 | 2-[1-(4,6-dimethylnaphthyloxy)]ethanol | Do. |
| 17 | 2-[1-(5-hydroxynaphthyloxy)]ethanol | Do. |
| 18 | 2-[1-(6-hydroxynaphthyloxy)]ethanol | Do. |
| 19 | 2-[1-(7-hydroxynaphthyloxy)]ethanol | Do. |
| 20 | 2-[2-(7-hydroxynaphthyloxy)]ethanol | Do. |
| 21 | 2-[2-(5-hydroxynaphthyloxy)]ethanol | Do. |
| 22 | 2-[1-(2-bromo-5-methoxynaphthyloxy)]ethanol | Do. |
| 23 | 2-[2-(8-hydroxynaphthyloxy)]ethanol | Do. |
| 24 | 2-(2-naphthyloxy)propanol | Do. |
| 25 | 2-(1-naphthyloxy)propanol | Do. |
| 26 | 2[2(5-bromonaphthyloxy)]propanol | Do. |
| 27 | 2[2(-4-t-butylnaphthyloxy)]propanol | Do. |

The above dyes can also be used to dye cellulose acetate, cellulose triacetate and polyamide fibers in bright pink shades of good fastness properties.

I claim:
1. An anthraquinone dye of the formula:

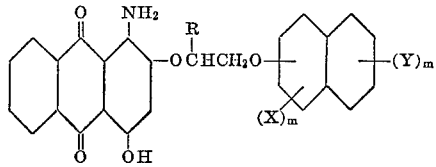

wherein X and Y are independently selected from the group consisting of hydrogen, chloro, bromo, lower alkyl, lower alkoxy, and hydroxy, $m$ and $n$ are integers having a value of 1–2 and R is a member selected from the group consisting of hydrogen and methyl.

2. 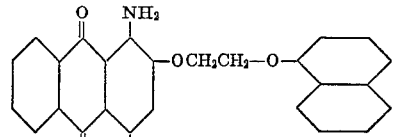

3. 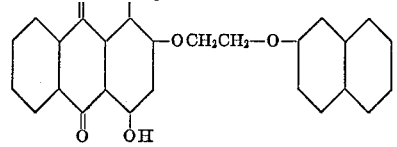

References Cited
FOREIGN PATENTS

| 835,819 | 5/1960 | Great Britain | 260—380 |
| 1,198,577 | 7/1970 | Great Britain | 260—378 |
| 1,196,308 | 7/1965 | West Germany | 260—380 |

LORRAINE A. WEINBERGER, Primary Examiner

R. GERSTL, Assistant Examiner

U.S. Cl. X.R.
8—39.40